Figure 1:
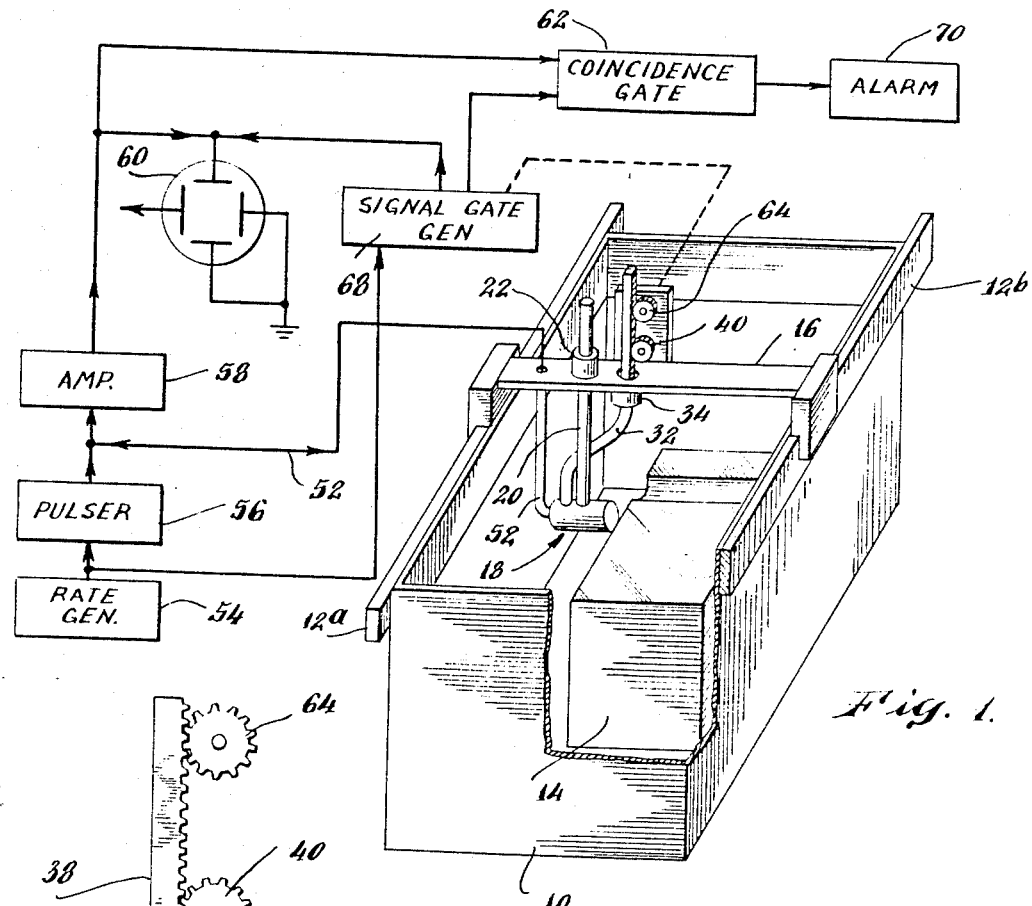

March 28, 1967  W. C. McGAUGHEY  3,310,977
ULTRASONIC INSPECTION APPARATUS USING
VARIABLE FOCUS AND GATE
Filed April 7, 1964

INVENTOR.
William C. McGaughey
BY
Wooster, Davis & Cifelli
ATTORNEYS.

United States Patent Office 3,310,977
Patented Mar. 28, 1967

3,310,977
ULTRASONIC INSPECTION APPARATUS USING VARIABLE FOCUS AND GATE
William C. McGaughey, New Fairfield, Conn., assignor to Automatic Industries, Inc., El Segundo, Calif., a corporation of California
Filed Apr. 7, 1964, Ser. No. 357,960
12 Claims. (Cl. 73—67.9)

One widely used system of ultrasonic non-destructive testing involves the use of a tank filled with a suitable liquid such as water. The material to be inspected is placed within the tank and the ultrasonic search unit is immersed within the liquid and suspended from a suitable carriage. Inspection of the test object is accomplished by causing the search unit to traverse the surface of the object, causing pulses of ultrasonic energy to be emitted from the search unit into the test object. Echoes are received from the test object which serve to indicate the presence of defects within it. This technique is well-known to those skilled in the art and, accordingly, will not be set forth in further detail.

In my copending United States patent application, Ser. No. 785,218, filed Jan. 6, 1959, now Patent 3,239,801, for Liquid Lens Ultrasonic Beam Controlling Device, there is disclosed a focusing ultrasonic lens. The lens comprises a cylindrical container closed at one end by a flexible diaphragm, the container being filled with a suitable liquid. An ultrasonic transducer is mounted within the cylinder to direct a beam of ultrasonic energy through the contained liquid and the diaphragm. Means are provided for varying the pressure of the liquid within the cylinder so that the curvature of the diaphragm may be changed.

As explained in the aforementioned patent application, the focusing lens may be utilized in immersion inspection techniques. The liquid contained within the cylinder is selected to have a different index of refraction than the liquid contained in the tank. For example, when water is used for the immersion test, the cylinder may contain glycerin. Accordingly, varying the shape of the diaphragm will cause refraction of the ultrasonic energy in a manner analogous to the refraction of light through an optical lens.

Although the liquid lens device is highly suitable for optimizing the ultrasonic beam for the best resolution and highest amplitudes at any depth in the test piece, the information display or alarm devices which are used with it are not as selective. For example, if the focus is adjusted to provide maximum resolution at some preselected depth within a test object, signals of much poorer resolution and below maximum amplitude will continue to be generated by reflectors from other regions within the object and will not be differentiated from the high resolution maximum amplitude signals. Also, it would be desirable to provide a beam focusing device which could be automatically controlled or programmed to vary the inspection depth so that test information is taken only under optimized resolving and maximum amplitude conditions.

Figure 2:
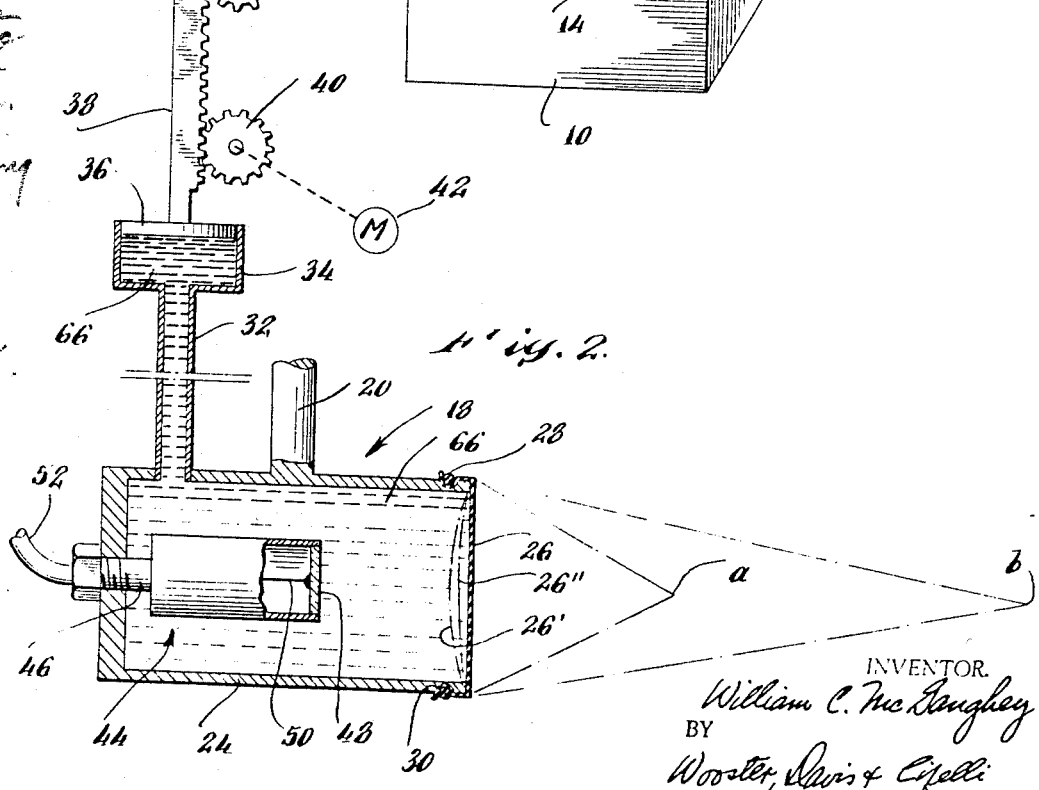

It is, accordingly, a primary object of the present invention to utilize the novel characteristics of a liquid lens ultrasonic beam controlling device in ultrasonic immersion testing. Other objects are to provide an ultrasonic test wherein an object may be inspected throughout its depth with optimum beam focusing and wherein echo signals are gated to maintain correspondence with a varying point of focus. Other objects, features, and advantages will be apparent from the following description, the appended claims and the figures of the attached drawing, wherein:

FIG. 1 is a partially schematic illustration of an ultrasonic test apparatus embodying the principle of the present invention, and FIG. 2 is an enlarged illustration of one portion of the apparatus of FIG. 1.

In accordance with the present invention, the liquid pressure within an ultrasonic liquid lens is caused to vary so as to cyclically move the point of focus of the ultrasonic radiation through the material under inspection. An electronic gate position control is connected so that all inspection is conducted at the optimum beam position.

In FIG. 1 there is illustrated an ultrasonic inspection tank 10 having a pair of guide rails 12a, 12b mounted thereon. The tank 10 is filled with water or other suitable coupling medium and the object 14 under inspection is submerged therein. A carriage 16 is mounted to travel along the guide rails 12a, 12b on suitable wheels or skids (not shown). A liquid lens assembly 18 is suspended below the carriage 16 on a suitable support such as rod 20. Rod 20 is mounted for vertical adjustment by means of a rotatable bushing 22 which is inwardly threaded and may be operated either manually or by suitable automatic means for raising and lowering the liquid lens assembly 18.

The liquid lens assembly 18 is illustrated in more detail in FIG. 2. Assembly 18 will be seen to consist of an open ended cylindrical container 24 having its open end closed by a resilient diaphragm 26 retained in position by means of a split ring 28 contained in a suitable groove 30. A pressure conduit 32 has one end connected to cylindrical container 24 and the other end connected to a pressure cylinder 34 which may be mounted on carriage 16 as shown in FIG. 1. A piston 36 is mounted at the lower end of a vertically movable rack gear 38 which is driven by a pinion 40 by a suitable driver such as servo-motor 42. An ultrasonic search unit 44 is mounted within the cylindrical container 24 on a suitable hollow stud 46 which threadedly engages the closed end of the cylinder. Search unit 44 holds an ultrasonic transducer such at piezo-electric crystal 48 in position for beaming ultrasonic wave energy toward diaphragm 26. An electrical connection 50 is made to the piezo-electric crystal 48 in the usual manner, and a coaxial cable 52 extends upwardly to carriage 16.

Referring back to FIG. 1, the electrical circuit of this invention will be seen to comprise a rate generator 54 which periodically energizes a radio frequency pulser 56 and a signal gate generator 68. The radio frequency pulses are applied to the piezo-electric crystal 48 by means of the coaxial cable 52 where they are converted to ultrasonic wave energy. The piezo-electric crystal 48 also converts ultrasonic wave energy which it receives into electrical signals which are returned along coaxial cable 52 and are amplified by a suitable amplifier 58. The output signals from amplifier 58 are applied both to the vertical plates of an oscilloscope 60 and to a coincidence gate circuit 62. The horizontal plates of oscilloscope 60 may be energized by a circuit with a suitable time base output such as a saw-tooth generator. A gate position control pinion gear 64 is in mesh with rack gear 38 so as to rotate to a position proportional to the pressure exerted on the fluid 66 contained within the liquid lens assembly 18. The gate position control pinion 64 is mechanically linked to signal gate generator 68. Generator 68 provides a gate signal to the vertical plates of oscilloscope 60 and to the coincidence gate circuit 62 at the end of a variable time period following each pulse from rate generator 54. This variable time period is related to the rotation of gate position control pinion 64 and, thus, to the pressure on liquid 66. Since the signal received by the coincidence gate 62 from the signal gate generator 68 is related to the pressure exerted on fluid 66, it will be apparent that the timing of this signal is also related to the curvature of the diaphragm 26 and, consequently, to the length of focus of the ultrasonic liquid lens assembly 18. Accordingly, it will be obvious that the signals passed by coincidence gate 62 from amplifier 58 will be only those signals which are received from locations within the test object 14 adjacent the focus of the liquid lens assembly. For example, with the pressure reduced sufficiently to cause diaphragm 26 to assume the position shown by the dash-dotted line 26', the ultrasonic beam would focus at a point $a$. With this pressure setting, the signal gate generator 68 would produce a signal that would allow only defect signals from the vicinity of point $a$ to pass through the coincidence gate 62 to the alarm 70. Similarly, with the pressure only reduced sufficiently to cause diaphragm 26 to assume the position shown by dash-dotted lines 26'', the ultrasonic beam would focus at point $b$ and only defect signals from the region surrounding point $b$ would be passed by the coincidence gate 62.

It will be obvious to those skilled in the art that the present invention provides a novel means for scanning through the depth of a test object while retaining the advantages of optimum resolution and minimum movement of elements. It will also be apparent from the foregoing description that a number of variations and modifications may be made in this invention without departing from its spirit and scope. Accordingly, it is to be understood that the foregoing description is illustrative only, rather than limiting. This invention is limited only by the scope of the following claims:

What I claim as new and desire to secure by Letters Patent of the United States is:

1. Ultrasonic inspection apparatus including the combination of
   a variable focus ultrasonic search unit,
   focusing means connected to said search unit and effective to vary the focus of said search unit,
   amplifier means coupled to the search unit and effective to receive and amplify electrical signals produced by said search unit,
   gating means coupled to the amplifier means and effective to pass said electrical signals occurring during a gating interval and to reject said electrical signals occurring outside the gating interval, said gating means being coupled to the focusing means and responsive to the variations of the focus of said ultrasonic search unit to synchronize the gating interval with the focus of the ultrasonic search unit, to pass electrical signals corresponding to ultrasonic signals emanating from the focus of said search unit, and
   utilization means connected to receive a selectively passed electrical signal and produce a physical response therefrom.

2. The apparatus of claim 1 wherein said gating means comprises: a signal gate generator connected to produce a gating signal at a time proportional to the length of focus of said search unit; and a coincidence gate connected to receive both said gating signal and said amplified electrical signals.

3. The apparatus of claim 1 wherein said search unit comprises a fluid-filled container having at least a portion of its outer surface formed of a flexible material.

4. The apparatus of claim 3 wherein said focusing means comprises fluid pressure control means in fluid flow relationship with the interior of said fluid-filled container.

5. Ultrasonic inspection apparatus which comprises: a variable focus ultrasonic search unit; focusing means connected to vary the focus of said search unit; a radio frequency pulser connected to periodically energize said search unit to produce pulses of ultrasonic energy; amplifier means connected to receive and amplify electrical echo signals from said search unit corresponding to ultrasonic echo signals received by said search unit; signal gate generator means mechanically linked to said focusing means to generate a gate signal during a predetermined time period occurring during amplification of electrical echo signals corresponding to ultrasonic echo signals originating from the focal region of said search unit; coincidence gate means connected to receive both said electrical echo signals and said gate signal; and utilization means connected to receive the output of said coincidence gate means.

6. The apparatus of claim 5 wherein said pulser is activated by a rate generator means.

7. The apparatus of claim 5 wherein said utilization means is an alarm.

8. The apparatus of claim 5 wherein said search unit comprises: a casing adapted to be immersed in a first liquid providing an ultrasonic energy coupling path to a test object, said casing having an open end spaced from said test object; a flexible diaphragm closing said open end; an ultrasonic transducer supported in said casing so as to transmit ultrasonic vibrations toward said diaphragm; and a second liquid filling the interior of the casing and having a substantially different acoustic velocity from said first liquid.

9. The apparatus of claim 8 wherein said focusing means comprises hydraulic pressure control means for varying the pressure of said second liquid.

10. Ultrasonic inspection apparatus including the combination of
    a variable focus ultrasonic search unit for transmitting ultrasonic energy and receiving ultrasonic energy and producing an electrical signal corresponding thereto,
    gate means coupled to said search unit and having a gate interval, said gate means being effective to pass electrical signals occurring during said gating interval and effective to reject said signals occurring outside the gate interval,
    focus means coupled to said search unit and effective to vary the focus of said search unit, and
    means coupling said gate means to said focus means and effective to vary the gating interval with variations in the focus of said ultrasonic unit.

11. Ultrasonic inspection apparatus including the combination of
    a variable focus ultrasonic search unit,
    transmitting means coupled to the search unit and effective to energize the search unit for transmitting ultrasonic energy,
    receiving means coupled to the search unit and effective to produce an electrical signal corresponding to the ultrasonic energy received by the search unit,
    gate means coupled to said receiving means and having a gate interval, said gate means being effective to pass the electrical signals from the receiving means occurring during said gating interval and effective to reject said signal occurring outside the gate interval,
    focusing means coupled to said search unit and effective to vary the focus of said search unit,
    means coupling said gate means to said focusing means and effective to vary the gating interval with variations in the focus of said ultrasonic unit, and
    utilizing means coupled to the gating means and responsive to the electrical signals passed by said gate means.

12. Ultrasonic apparatus for inspecting a workpiece, said apparatus including the combination of
    variable focus ultrasonic search unit for transmitting ultrasonic energy into the workpiece and receiving ultrasonic energy therefrom,
    transmitting means coupled to the search unit and effective to energize the search unit for transmitting ultrasonic energy,
    receiving means coupled to the search unit and effective to produce an electrical signal corresponding to the ultrasonic energy received by the search unit,
    gate means coupled to said receiving means and having a gate interval, said gate means being effective to pass the electrical signals from the receiving means and which occur during said gating interval and effective to reject said signal occurring outside the gate interval, means coupled to said search unit and to said gate means, said last means being effective to simultaneously vary the focus of said search unit and said gating interval whereby the gating interval is coincident with the occurrence of signals corresponding to the focus of said search unit, and means for scanning said search unit across the workpiece.

References Cited by the Examiner

UNITED STATES PATENTS

| 3,090,030 | 5/1963 | Schuck | 73—67.8 X |
| 3,245,251 | 4/1966 | Von Ardenne | 73—67.9 |
| 3,269,173 | 8/1966 | Von Ardenne | 73—67.9 |

RICHARD C. QUEISSER, *Primary Examiner.*

JOHN P. BEAUCHAMP, *Examiner.*